F. G. FARR.
LIQUID DISPENSING APPARATUS.
APPLICATION FILED JULY 19, 1919.
1,383,708.
Patented July 5, 1921.
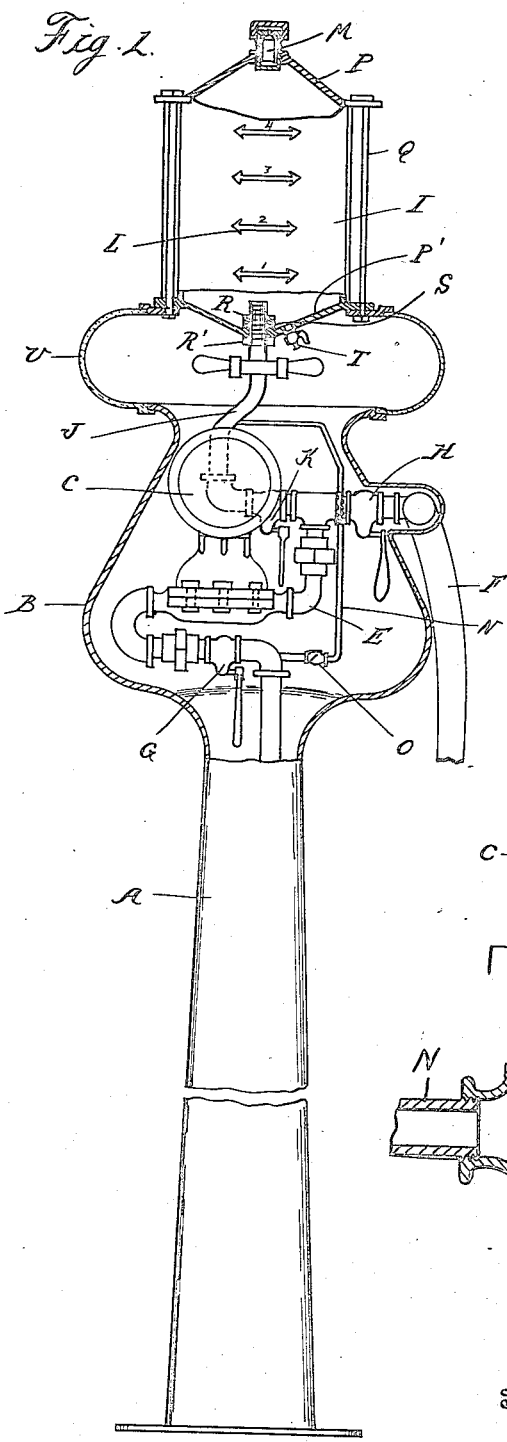
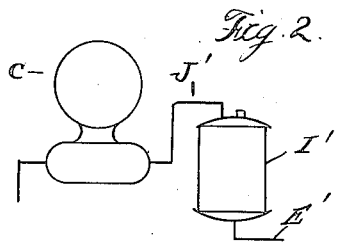
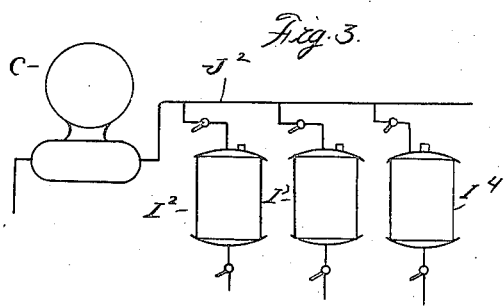
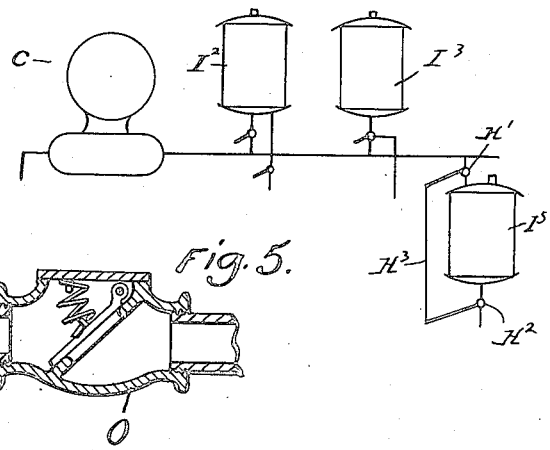
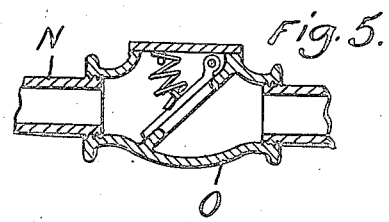
Inventor
Frederick G. Farr
By Whittemore, Hulbert &
Whittemore
Attorneys

UNITED STATES PATENT OFFICE.

FREDERICK G. FARR, OF DETROIT, MICHIGAN, ASSIGNOR TO HYDRAULIC OIL SYSTEMS CORPORATION, OF DETROIT, MICHIGAN, A CORPORATION OF MICHIGAN.

LIQUID-DISPENSING APPARATUS.

1,383,708.   Specification of Letters Patent.   Patented July 5, 1921.

Application filed July 19, 1919. Serial No. 311,935.

*To all whom it may concern:*

Be it known that I, FREDERICK G. FARR, a citizen of the United States of America, residing at Detroit, in the county of Wayne and State of Michigan, have invented certain new and useful Improvements in Liquid-Dispensing Apparatus, of which the following is a specification, reference being had therein to the accompanying drawings.

The invention relates to liquid dispensing apparatus such as used in the retailing of gasolene and hydrocarbon fuels, and the invention consists in certain features of construction as hereinafter set forth.

In the drawings:

Figure 1 is a sectional elevation of the dispensing apparatus;

Figs. 2, 3 and 4 are diagrammatic views showing different modifications.

Fig. 5 is a sectional detail view of a check valve employed in the invention.

In the retailing of gasolene and similar liquid fuels it is usual to employ an inclosed meter, from which the liquid is delivered through a flexible hose into the tank or other receptacle. Such apparatus, if properly adjusted, will give an accurate measurement of the liquid and will record the same, but the customer may not be satisfied as to the accuracy. It is, therefore, one of the objects of the present invention to provide a check on the accuracy of the meter and one giving satisfactory visual evidence. It is a further object to obtain this result without complication of the apparatus or interference with the normal operation of the regular meter.

In detail, A is a suitable standard supporting a housing B containing a meter C of any suitable construction, but, as shown, having a dial indicator D visible at the front of the housing. E is the delivery conduit from the meter, which is connected to the flexible hose F through which the liquid may be discharged into the tank. G is a valve in the inlet conduit to the meter and H is a valve in the outlet conduit E.

As a check upon the accuracy of the meter I have arranged adjacent to the housing B a transparent measuring receptacle I. This is connected to the conduit E by a branch conduit J which is controlled by a valve K. Thus, by closing the valve H and opening the valve K the liquid which is passed through the meter C will be forced upward into the transparent tank I, this being suitably calibrated as by the lines L. The customer may, therefore, verify the measurement by a glance, after which by opening the valve H the liquid will flow by gravity from the receptacle I into the hose F.

To hold the liquid from backward movement through the meter when the pressure is released, the valve G is closed and when this is done the liquid may be retained in the receptacle I for any length of time. The upper end of the receptacle I must be vented, but to avoid the possibility of escape of the liquid through this vent a float valve M or other equivalent device is used for sealing the vent when the receptacle is full. To guard against injury by expansion of the liquid when the receptacle I is full, a by-pass N is provided connecting the conduits J and the inlet conduit below the valve G. The by-pass N has a check valve O therein which closes against upward movement of the liquid but will automatically open by downward pressure. The size of this by-pass is relatively small and, if desired, the check valve may be held to its seat by spring tension sufficient to balance the head of liquid in the tank, but which will yield upon an excess pressure.

The receptacle I is preferably formed of a glass cylinder with heads P and P' at opposite ends thereof connected by the tie rods Q. To secure accuracy in measurement, it is desirable to provide an adjustment device for the original setting, and for this purpose the head P' has a threaded engagement on the conduit J permitting of raising or lowering the same. R and R' are lock nuts above and below the head engaging the threaded conduit J, and S are gaskets for forming a liquid tight seal. This construction permits of raising or lowering the receptacle I relative to the upper end of the conduit J, and as the liquid flows out through this conduit by gravity the level of the upper end will determine the quantity discharged. It may be necessary, however, to trap a small amount of the liquid in the receptacle below the upper end of the conduit J, as indicated. A petcock T is arranged on the head P' to drain off this trapped liquid at any time  U is a luminous globe arranged between the receptacle I and the housing B for furnishing light to observe both the meter dial and the calibrated receptacle.

Whenever it is desired to dispense with the checking measurement the valve K is closed, which permits the direct delivery of the liquid from the meter into the conduit F. The trapping of any of the delivered liquid in the conduit F is prevented by the air vent at the upper end of the receptacle I.

In Fig. 2 a modified construction is shown in which the receptacle I' is connected to the meter C by a conduit J' entering the top of said receptacle, while a conduit E' for delivery connects with the bottom of the receptacle. This arrangement shows to the purchaser that the fuel which is measured in the receptacle cannot be returned to the source, but must pass into the delivery conduit.

In Fig. 3 a series of receptacles I², I³ and I⁴ are connected to a common supply conduit J² which leads from the meter C, this arrangement permitting the measuring and delivering the fuel at different points, while the meter is a check on the total quantity so delivered.

In Fig. 4 is an arrangement similar to Fig. 3 showing the receptacles I², I³, etc., above the level of the meter instead of below the same and also showing one receptacle I⁵ below the level of the meter and controlled by valves H' and H² which are connected through mechanism H³ to operate reversely in opening and closing.

What I claim as my invention is:

1. In a liquid dispensing apparatus, the combination with a meter and a delivery conduit, of a measuring receptacle, a branched connection between the meter and said measuring receptacle and delivery conduit respectively, and a valve in each branch of said connection.

2. In a liquid dispensing apparatus, the combination with a meter, of a delivery conduit, a measuring receptacle, a branched connection between the meter and the measuring receptacle and delivery conduit respectively, a valve in each branch, and a valve controlled inlet to the meter.

3. In a liquid dispensing apparatus, the combination with a meter, a discharge conduit, a measuring receptacle above said meter, a branched conduit leading from said meter to said receptacle and to said discharge conduit, the end of the branch leading to said receptacle extending upward therein, and means for adjusting the height of said upward extension relative to said measuring receptacle.

4. In a liquid dispensing apparatus, the combination with a meter and a discharge conduit, of a measuring receptacle above said meter having an air vent at its upper end, valve-controlled connections between said meter and said measuring receptacle and discharge conduit respectively, a valve for closing said vent when said receptacle is filled with liquid, and a by-pass around said meter having a check valve therein preventing outward flow of liquid but relieving pressure in said receptacle.

5. In a liquid dispensing apparatus, the combination with a standard, of a housing thereon, a transparent globe surmounting said housing, a measuring receptacle surmounting said globe, a meter within said housing, illuminating means within said globe, a liquid delivery connection to said meter, a discharge conduit, and connections for alternatively delivering the metered liquid into said measuring receptacle or directly to said discharge conduit.

6. In a liquid dispensing apparatus, the combination with a meter, a liquid delivery conduit leading to said meter, a measuring receptacle for the metered liquid, connections for alternatively delivering the metered liquid into said measuring receptacle, or directly to a discharge conduit, and means for trapping a variable quantity of the liquid in the measuring receptacle, forming an adjustment for accuracy.

In testimony whereof I affix my signature.

FREDERICK G. FARR.